United States Patent [19]

Kearsley

[11] Patent Number: 4,477,796

[45] Date of Patent: Oct. 16, 1984

[54] SPATIAL ACQUISITION FLASH BEACON

[76] Inventor: Wayne A. Kearsley, 15 Rangeway Rd., Mont Vernon, N.H. 03057

[21] Appl. No.: 427,968

[22] Filed: Sep. 29, 1982

[51] Int. Cl.³ .............................................. B60Q 1/00

[52] U.S. Cl. ...................................... 340/105; 340/77; 340/114 R; 340/331; 340/981; 315/200 A; 315/241 S; 315/241 R

[58] Field of Search ..................... 340/105, 321, 81 R, 340/114 R, 114 B, 84, 87, 107, 77, 76, 331, 332; 315/200 R, 200 A, 241 P, 241 S, 241 R

[56] References Cited

U.S. PATENT DOCUMENTS 3,753,039 8/1973 Bonazoli et al. ................ 315/200 A 3,792,309 2/1974 McDonald ...................... 315/200 A 3,846,750 11/1974 Kearsley ............................ 340/105

4,200,823 4/1980 Keeran et al. ...................... 340/331

*Primary Examiner*—Donnie L. Crosland

*Attorney, Agent, or Firm*—Thomas N. Tarrant

[57] ABSTRACT

A flash beacon is described which uses a strong bright initial flash to attract attention followed by a series of weaker flashes to enable a person to easily locate the beacon source. The weaker flashes may be broken into code groups for identification or other purposes. An electrical circuit utilizing three capacitor banks interacting with each other, is described for operating the flash sequences.

7 Claims, 4 Drawing Figures

SPATIAL ACQUISITION FLASH BEACON

BACKGROUND OF THE INVENTION

1. Field of the Invention

The present invention relates to flash beacons used primarily for tall structure warning and for navigational purposes. It relates particularly to such beacons having different modes of operation for different visibility conditions.

2. Relation to the Prior Art

With the speed of modern aircraft, beacons are needed even in the best of daylight visibility and the red lights used for illuminationg tall structures are no longer adequate. For the most attention-getting efficiency, flash lamps are used with high energy in very short flashes. At night, single short flashes attract attention, but produce their own problems. Bright short flashes at night have a saturating effect on vision that makes them difficult to locate spatially. U.S. Pat. No. 3,846,750 of the present inventor describes a beacon using bursts of flashes at night and single flashes of much higher intensity in daylight. The nighttime burst of low level flashes is spread over a sufficient time interval to allow precise visual spatial location. The low intensity level in the burst flashes is not highly efficient for initial attention attraction.

SUMMARY OF THE INVENTION

In accordance with the invention, it has been found that a single high intensity flash followed by a burst of low intensity flashes attracts attention efficiently and provides ease of spatial acquisition. An electrical circuit using three interactive capacitor banks will provide such a sequence.

DESCRIPTION OF THE PREFERRED EMBODIMENTS

Figure 1:
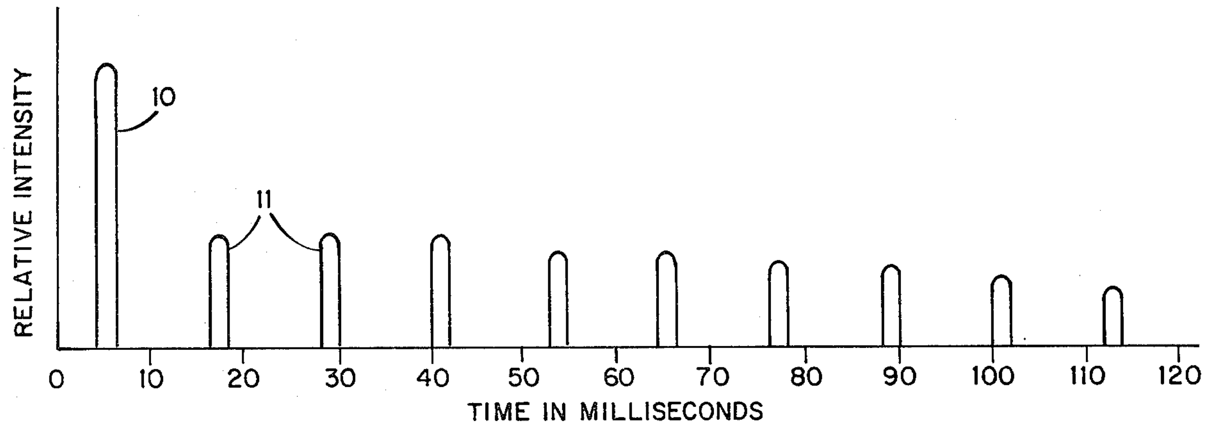
FIG. 1 is a graph of light intensity pulses from a beacon according to the invention operating in the burst mode.
Figure 2:
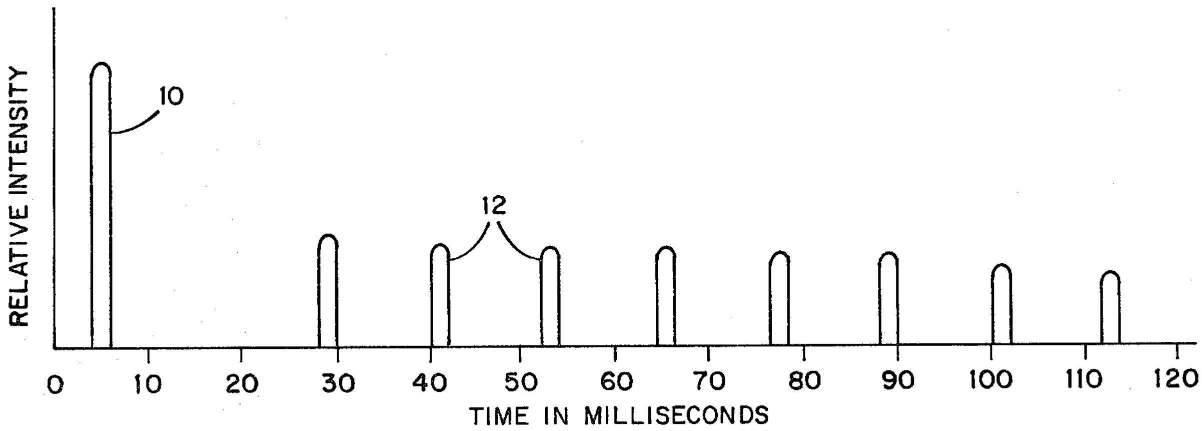
FIG. 2 is a graph of light intensity pulses from a beacon operating in the burst mode with a pause between the first high intensity flash and the following low intensity flashes.
Figure 3:
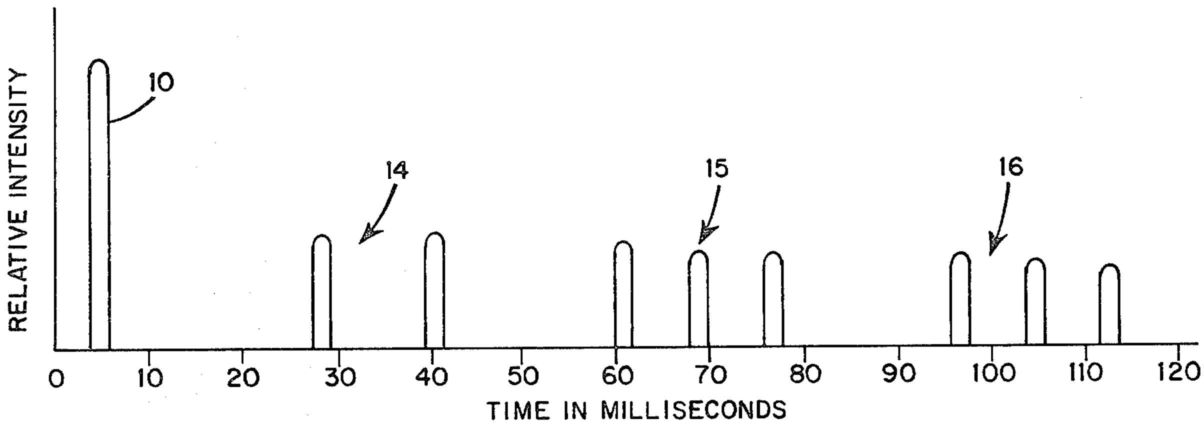
FIG. 3 is a graph of light intensity pulses from a beacon operating in the burst mode in which the burst of low intensity flashes is broken into code groups.

In good visibility daytime conditions, single bright flashes provide good efficient beacon operation. Attention is attracted and other visual references are available for location purposes. Thus the invention utilizes such single flashes under usual daytime conditions. Since such single flashes are usual, the graphs of FIGS. 1, 2 and 3 depict only the night mode of the invention illustrating three method embodiments accoding to the invention.

A bright flash can register on the human eye and attract attention even when the duration of the flash is less than a microsecond. Ten joules of energy packed into a flash of one millisecond duration is much more attention-getting than if spread out over a full second. Thus in FIG. 1, bright flash 10 is only 2 ms (milliseconds) in duration, but has 30 joules of energy. Multiple lower intensity flashes 11 are depicted at 12 ms intervals and are also 2 ms induration. Each of flashes 11 has a typical energy of 2 joules. With 10 flashes including flash 10, the total time duration of the group is 110 ms. In order to provide adequate time for good spatial acquisition, it has been found that the time duration of the flash group or "burst" of flashes is preferably at least 100 ms.

For power consumption efficiency, it is preferable to limit the duration of a group to 250 ms. Individual flashes are desirably in the range of 0.1 ms to 10 ms long. Putting the same energy into shorter flashes reduces the lifetime of the flashlamps and, when the flashes are shorter than about 50 microseconds, rf noise radiation starts becoming a problem. Of course the individual flashes can be longer in duration, but then efficiency drops off such that flash durations greater than 50 ms must be regarded as wastefully inefficient. The exact amount of energy in each flash is not relevant to the invention, but must be determined by the distance at which the beacon is to be effective and the atmospheric conditions to be overcome (fog, clouds etc.).

Understanding that the following examples are only exemplary within the ranges described above, FIGS. 1 through 3 give flash sequences for three flash methods. FIG. 1 depicts a first bright flash 10 followed by nine smaller flashes all of the same duration and equally spaced. Bright flash 10 and smaller flashes 11 are all depicted with a flash duration of 2 ms and an overall group duration of 110 ms. The group is repeated at a rate not relevent to the invention.

Since the first bright flash has a saturation effect on vision, FIG. 2 improves energy efficiency by eliminating the first small flash. Thus in FIG. 2 there are only eight flashes 12. This is more energy efficient since the first weak flash would not be observed anyway. It follows too close on a much brighter flash.

FIG. 3 depicts coded groups. As will be described with relation to FIG. 4, flashing is controlled by trigger pulses. Since trigger pulses are readily subjected to logic programming, flashes are easily provided in code groups. Using code groups, each beacon can be self-identifying in the manner of some light houses and many radio navigational beacons. FIG. 3 depicts code groups as two, three and three grouped flashes following the first bright flash. Once the beacon has been spatially located, the groups are easily counted on the next repition of the sequence. Thus in FIG. 3, flash 10 is followed by first code group 14, second code group 15 and third code group 16.

Figure 4:
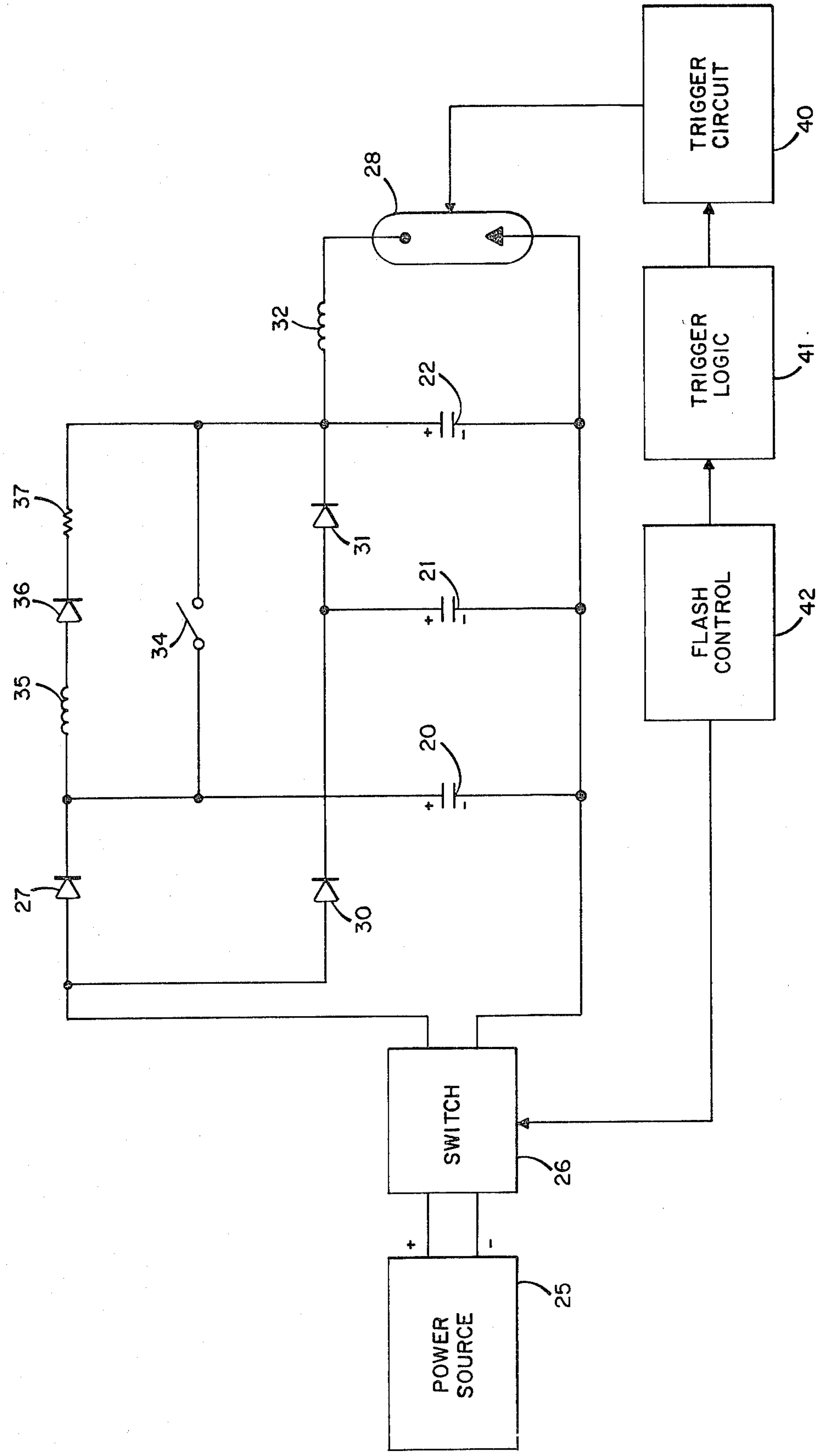
FIG. 4 is a diagram, partially schematic and partially block, depicting a circuit embodiment according to the invention.

Part of the invention is a new and simple electrical circuit for operating the flash beacon. The heart of this circuit, as depicted in FIG. 4, is three interacting capacitor banks, 20, 21 and 22. Capacitor banks 20, 21 and 22 can be single capacitors or plural capacitors connected to provide the capacity and voltage rating required. Capacitor bank 20 preferably has 5 to 10 times the capacity of capacitor banks 21 and 22 combined. Capacitor bank 21 preferably has 10 to 20 times the capacity of capacitor bank 22. The exact size (capacity) of the capacitor banks and the voltage to be applied to them, determine the amount of energy in each flash. As has been previously stated, this is not relevant to the invention and thus is not specified.

Capacitor bank 20 is connected across power source 25. Electronic switch 26 is shown connected between power source 25 and capacitor bank 20 for reasons that will be described. Power source 25 is depicted as a DC source with its positive terminal connected through switch 26 to the anode of diode 27. The cathode of diode 27 is connected to the positive terminal of capacitor bank 20. The negative terminal of power source 25 is connected through switch 26 to the negative terminal of capacitor bank 20 and also to the negative terminals of capacitor banks 21 and 22 and the cathode of flash tube 28. The positive terminal of power source 25 is connected through switch 26 to the anode of diode 30 the cathode of which is connected to the positive terminal of capacitor bank 21 and also to the anode of diode 31. The cathode of diode 31 is connected to the positive terminal of capacitor bank 22 and through choke 32 to the anode of flash tube 28. Capacitor bank 20 is connected to flash tube 28 through choke 32 and switch 34. In parallel with switch 34 is a charging network for burst capacitor bank 22. The charging network consists of an inductor 35 connected to the positive terminal of capacitor bank 20 and to the anode of diode 36, followed by resistor 37 connected between the cathode of diode 36 and the positive terminal of capacitor bank 22. Trigger circuit 40 is a high voltage circuit putting out a fast pulse typically in the range of 5 to 20 thousand volts. As is known in the art, this pulse is applied across part or all of the flash tube for ionizing the gas in the tube thus initiating discharge. Trigger circuits are typically actuated by low voltage switching inputs. Such an input can be provided from usual logic circuits and trigger logic 41 consists of typical logic circuitry that can be programmed or hard wired for the desired flashing sequences. Trigger logic 41 has an output connected to the input of trigger circuit 40 and an input connected from the output of flash control 42. Flash control 42 has a second output connected to switch 26. Flash control 42 is suitably a counter or timing circuit that periodically initiates a trigger sequence in trigger logic 41 and simultaneously actuates switch 26 to open the connection from power source 25. Switch 26 is suitably a silicon controlled rectifier switching circuit for AC or pulsed power sources and suitably a transistor switching circuit for DC sources such as depicted. Switch 26 can also be located ahead of power source 25 so as to switch a lower voltage AC rather than a high voltage DC power.

Operation is as follows. Source 25 charges all three capacitor banks, 20, 21 and 22. Day mode operation is with switch 34 closed. Flash control 42, operating at the cyclical rate of the beacon, initiates trigger logic 41 and simultaneously opens switch 26. Trigger circuit 40 triggers flash tube 28 and the stored energy in all capacitor banks, 20, 21 and 22 is discharged through flash tube 28. It will be understood that trigger logic 41 may be switched together with switch 34 so that only a single trigger per cycle is used. This is not really necessary however since the following triggers in a sequence would have no effect in daytime mode. All the capacitors would be discharged by the first flash and would stay discharged until after the trigger sequence had ended. It will be recognized that choke 32 controls the length of the flash pulse.

Switching to the night or "burst" mode of operation, the three capacitor banks all charge as before. Switch 34 is open so the first trigger to flash tube 28 cannot discharge capacitor bank 20 through the flash tube. Instead, the first discharge is the combined charges from capacitor banks 21 and 22. Capacitor bank 21 cannot recharge since switch 26 is open. But capacitor bank 22 recharges from capacitor bank 20 through resistor 37, diode 36 and inductor 35. Diodes 27 and 31 isolate capacitor bank 21 from capacitor bank 20 so that none of the charge on capacitor bank 20 is discharged to capacitor bank 21. The next trigger from trigger circuit 40 discharges only capacitor bank 22 through flash tube 28.

The resistance of burst capacitor charging network, 35, 36 and 37 is high enough so that discharge of capacitor bank 20 is less than the ionization current required for flash tube 28. At the same time the LCR time constant of the burst charging network must be small enough to allow at least 3 and preferably at least 5 LCR time between burst flashes. Since the voltage on capacitor bank 20 will be reduced each time it recharges capacitor bank 22, the recharge voltage attained by capacitor bank 22 will also be reduced reducing the intensity of the burst flashes with each succeeding flash. This reduction need not be significant depending on the relative sizes of the two capacitor banks and the number of flashes in a burst.

While the present description has been limited to specific embodiments, many variations are contemplated as within the skill of the art and the scope of the invention. The invention is considered to be in the use of a large attention-getting light pulse followed by a sequence of lesser pulses as well as in a generalized circuit for producing the same. Thus it is the intention to cover the invention as set forth in the following claims.

I claim:

1. A method of operating a light beacon for improved attention gathering and better spatial acquisition ease comprising:

(a) Discharging a first light flash of between 50 microseconds and 10 milliseconds duration at a first energy level;

(b) discharging a burst of at least four light flashes, each having less than one fourth the energy of said first light flash, following said first light flash and terminating at least 100 milliseconds after the beginning of said first light flash; and, (c) repeating the above first light flash and the above burst at an established rate.

2. A method of operating a light beacon according to claim 1 wherein said burst is triggered over a total time duration of between one tenth second and one second.

3. A method of operating a light beacon according to claim 1 wherein each flash in said first light flash and said burst is triggered at equally spaced time intervals.

4. A method of operating a light beacon according to claim 1 wherein the first flash of said burst is delayed in time beyond said first light flash by a substantially greater time interval than that between consecutive flashes in said burst.

5. A method of operating a light beacon according to claim 1 wherein the flashes in said burst are broken into code groups by triggering the flashes at different time delay intervals.

6. A method of operating a light beacon according to claim 1 wherein the beacon is flashed with discharge pulses having a length at the half power points in the range of 0.1 to 10 milliseconds and is triggered to provide a total burst duration including the first light flash in the range of 100 to 250 milliseconds.

7. A flashing circuit for flash beacons comprising:

(a) A flash lamp;

(b) impedance means in series with said flash lamp for controlling the duration of each flash and aiding the termination of current through the lamp at the end of each flash;

(c) a first capacitor connected to said flash lamp for single flash operation;

(d) a second capacitor of substantially less capacity than said first capacitor connected to said flash lamp for the first flash in a burst mode sequence;

(e) a third capacitor of substantially less capacity than said second capacitor connected to said flash lamp for flashes following the first flash in a burst mode sequence;

(f) a unilateral conductor connected between said second capacitor and said third capacitor for blocking interaction between the two during burst operation; and, (g) a charging network connected between said first capacitor and said third capacitor for recharging said third capacitor from said first capacitor during burst operation.

* * * * *